United States Patent
Dick et al.

(10) Patent No.: US 7,970,127 B2
(45) Date of Patent: *Jun. 28, 2011

(54) USER EQUIPMENT IDENTIFICATION SPECIFIC SCRAMBLING

(75) Inventors: Stephen G. Dick, Nesconset, NY (US); Nader Bolourchi, Larchmont, NY (US); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/467,694

(22) Filed: May 18, 2009

(65) Prior Publication Data

US 2009/0219907 A1    Sep. 3, 2009

Related U.S. Application Data

(63) Continuation of application No. 11/796,534, filed on Apr. 24, 2007, now Pat. No. 7,536,013, which is a continuation of application No. 10/779,431, filed on Feb. 13, 2004, now Pat. No. 7,349,540, which is a continuation of application No. 10/187,640, filed on Jul. 1, 2002, now Pat. No. 6,973,579.

(60) Provisional application No. 60/378,509, filed on May 7, 2002, provisional application No. 60/378,170, filed on May 13, 2002.

(51) Int. Cl.
*H04L 9/00* (2006.01)
(52) U.S. Cl. ............................................ 380/2; 380/210
(58) Field of Classification Search .................. None
See application file for complete search history.

(56) References Cited

U.S. PATENT DOCUMENTS

| 3,569,956 | A | 3/1971 | Duffy |
| 5,091,942 | A | 2/1992 | Dent |
| 5,161,244 | A | 11/1992 | Maurer |
| 5,230,003 | A | 7/1993 | Dent et al. |
| 5,365,588 | A | 11/1994 | Bianco et al. |
| 5,671,218 | A | 9/1997 | I et al. |
| 5,765,126 | A | 6/1998 | Tsutsui et al. |
| 5,799,154 | A | 8/1998 | Kuriyan |
| 5,917,852 | A | 6/1999 | Butterfield et al. |

(Continued)

FOREIGN PATENT DOCUMENTS

CA    2 228 714    1/1998

(Continued)

OTHER PUBLICATIONS

"$3^{rd}$ Generation Partnership Project: Technical Specification Group Radio Access Network; Multiplexing and channel coding (FDD) (Release 5)," 3GPP TS 25.212 v5.1.0-DRAFT, Jun. 2002.

(Continued)

*Primary Examiner* — Brandon S Hoffman
(74) *Attorney, Agent, or Firm* — Volpe and Koenig, P.C.

(57) ABSTRACT

A base station for use in a code division multiple access communication system comprises circuitry configured to process a user equipment identification (UE ID) by ½ rate convolutionally encoding the UE ID to produce a code. The code is used by the base station for scrambling a high speed shared control channel (HS-SCCH). The base station is configured to transmit a wireless signal. The wireless signal provides the user equipment with payload data carried on a high speed physical downlink shared channel (HS-PDSCH). The HS-PDSCH is associated with the HS-SCCH.

14 Claims, 2 Drawing Sheets

U.S. PATENT DOCUMENTS

| | | | |
|---|---|---|---|
| 5,995,515 | A | 11/1999 | Suzuki |
| 6,012,160 | A | 1/2000 | Dent |
| 6,014,567 | A | 1/2000 | Budka |
| 6,167,552 | A | 12/2000 | Gagnon et al. |
| 6,188,717 | B1 | 2/2001 | Kaiser et al. |
| 6,201,811 | B1 | 3/2001 | Larsson et al. |
| 6,208,615 | B1 | 3/2001 | Faruque et al. |
| 6,377,611 | B1 | 4/2002 | Hwang |
| 6,385,183 | B1 | 5/2002 | Takeo |
| 6,400,703 | B1 | 6/2002 | Park et al. |
| 6,430,722 | B1 | 8/2002 | Eroz et al. |
| 6,493,331 | B1 | 12/2002 | Walton et al. |
| 6,539,047 | B1 | 3/2003 | Moon |
| 6,549,779 | B1 | 4/2003 | Miller et al. |
| 6,553,535 | B1 | 4/2003 | Asada et al. |
| 6,567,461 | B1 | 5/2003 | Moon et al. |
| 6,731,618 | B1 | 5/2004 | Chung et al. |
| 6,802,033 | B1 | 10/2004 | Bertin et al. |
| 6,871,313 | B2 | 3/2005 | Gopalakrishnan |
| 6,915,473 | B2 | 7/2005 | Bolourchi et al. |
| 6,917,603 | B2 | 7/2005 | Strawczynski et al. |
| 6,973,579 | B2 | 12/2005 | Dick et al. |
| 6,983,412 | B2 | 1/2006 | Fukumasa |
| 7,058,132 | B1 | 6/2006 | Sebire et al. |
| 7,120,435 | B2 | 10/2006 | Usher et al. |
| 7,162,675 | B2 | 1/2007 | Das et al. |
| 7,173,919 | B1 | 2/2007 | Dabak |
| 2002/0009129 | A1 | 1/2002 | Choi et al. |
| 2002/0018565 | A1 | 2/2002 | Luttrell et al. |
| 2002/0044542 | A1 | 4/2002 | Kim et al. |
| 2002/0075838 | A1 | 6/2002 | Choi et al. |
| 2002/0075964 | A1 | 6/2002 | Okumura |
| 2002/0114268 | A1 | 8/2002 | Kim et al. |
| 2002/0177436 | A1 | 11/2002 | Lemieux |
| 2003/0005388 | A1 | 1/2003 | Fukumasa |
| 2003/0048800 | A1 | 3/2003 | Kilfoyle et al. |
| 2003/0074476 | A1 | 4/2003 | Kim et al. |
| 2003/0108013 | A1 | 6/2003 | Hwang et al. |
| 2003/0189918 | A1 | 10/2003 | Das et al. |
| 2005/0063347 | A1 | 3/2005 | Sarkkinen et al. |

FOREIGN PATENT DOCUMENTS

| | | |
|---|---|---|
| GB | 2 259 226 | 3/1993 |
| JP | 02291737 | 12/1990 |
| JP | 2001-326968 | 11/2001 |
| KR | 2001 0063271 | 7/2001 |
| KR | 2003 0080306 | 10/2003 |
| WO | 97/16899 | 5/1997 |
| WO | 99/07076 | 2/1999 |
| WO | 99/18689 | 4/1999 |
| WO | 99/33271 | 7/1999 |
| WO | 00/41316 | 7/2000 |
| WO | 01/06662 | 1/2001 |
| WO | 01/18055 | 3/2001 |
| WO | 01/50675 | 7/2001 |
| WO | 02/05445 | 1/2002 |
| WO | 03/065618 | 8/2003 |

OTHER PUBLICATIONS

"3rd Generation Partnership Project: Technical Specification Group Radio Access Network; Multiplexing and Channel Coding (FDD) (Release 5)," 3GPP TS 25.212 v5. 0.0 (Mar. 2002).

"3rd Generation Partnership Project: Technical Specification Group Radio Access Network; High Speed Downlink Packet Access: Physical Layer Aspects (Release 5)," 3GPP TR 25.858 V5.0.0 (Mar. 2002).

"3$^{rd}$ Generation Partnership Project; Technical Specification Group Radio Access Network, Multiplexing and Channel Coding (FDD) (Release 5)", 3GPP TS 25.212 V5.0.0, Mar. 2002.

"3rd Generation Partnership Project; Technical Specification Group Radio Access Network; High Speed Downlink Packet Access (HDSPA); Overall Description; Stage 2 (Release 5)," 3GPP TS 25.308 v5.2.0 (Mar. 2002) Technical Specification.

"3rd Generation Partnership Project; Technical Specification Group Radio Access Network; High Speed Downlink Packet Access; Physical Layer Aspects (Release 5)," 3GPP TR 25.858 v1.0.0 (Dec. 2001) Technical Report.

"3rd Generation Partnership Project; Technical Specification Group Radio Access Network; Multiplexing and channel coding (TDD) (Release 4)," 3GPP TS 25.222 v4.2.0 (Dec. 2001) Technical Specification.

"3rd Generation Partnership Project; Technical Specification Group Radio Access Network; Multiplexing and channel coding (TDD) (Release 5)," 3GPP TR 25.222 v5.2.0 (Sep. 2002) Technical Specification.

"Draft Minutes of WG1 #21 Meeting," TSG—RAN Working Group 1 Meeting No. 22, TSGR1-01-0990, New York, New York, Oct. 23-26.

"Draft Minutes of WG1 #22 Meeting," TSG-RAN Working Group 1 Meeting No. 23, TSGRI-01-1354, Espoo, Finland, Jan. 8-11.

"Draft Minutes of WG1 #25 Meeting," TSG-RAN Working Group 1 Meeting No. 25, TSGRI-02-0688, Paris, France, Apr. 9, 2002.

"Revised Minutes of TSG RAN WG1 #23 Meeting," TSG-RAN Working Group 1 Meeting No. 24, TSGR1-02-0356, Orlando, Florida, Feb. 18-22.

"Revised Minutes of TSG RAN WG1 #25 Meeting," TSG-RAN Working Group 1 Meeting No. 25, TSGR1-02-0791.

"Revised Minutes of TSG-RAN WG1 #24," TSG-RAN Working Group 1 Meeting No. 25, TSGR1-02-0575, Paris, France, Apr. 9-12.

3GPP TR 25.858, "Technical Specification Group Radio Access Network; High Speed Downlink Packet Access; Physical Layer Aspects," 3$^{rd}$ Generation Partnership Project; V5.0.0, 3GPP, (Release 5) Mar. 2002, pp. 1-31.

3GPP, 3$^{rd}$ Generation Partnership Project (3GPP); Technical Specification Group Radio Access Network Multiplexing and channel coding (FDD), 3G TS 25.212, Version 3.0.0 (Oct. 1999).

Chen, W. et al. "A novel code assignment scheme for W-CDMA systems", Vehicular Technology Conference, 2001. VTC 2001 Fall. IEEE VTS 54$^{th}$.

Cheng, R. et al. "OVSF Code Channel Assignment for IMT-2000", Vehicular Technology Conference Proceedings, 2000. VTC 2000—Spring Tokyo, 2000.

CWTS/Huawei Technologies Co., Ltd., "Discussion About SCCH-HS channel coding and necessity of transmission of HI", R1-02-0114, (Jan. 2002).

Draft minutes of TSG RAN WG1 #24 meeting, TSG-RAN Working Group 1 meeting No. 25, Apr. 9-12, Paris, France, TSGR1-02-0520.

Ericsson, "Shared control Channel, detailed structure (revision of R1-01-1115)", R1-01-1051, 3GPP TSG-RAN1 #22 Nov. 19-23, 2001, Cheju, Korea.

ETSI TS 125 212 v5.0.0 (Mar. 2002) Technical Specification, "Universal Mobile Telecommunications System (UMTS); Multiplexing and Channel Coding (FDD) (3GPP TS 25.212 version 5.0.0 Release 5)" (European Telecommunication Standards Institute, 2002).

Expert Report of Dr. Apostolos K. Kakaes Regarding Invalidity of U.S. Patent No. 6,973,579, in the Matter of Certain 3G Wideband Code Division Multiple Access (WCDMA) Handsets and Components Thereof, (Oct. 17, 2007).

Expert Report of Dr. Apostolos K. Kakaes Regarding Invalidity of U.S. Patent No. 6,973,579, (Feb. 1, 2008).

Gitlin, Richard D. et al., Data Communication Principles (1992).

GSM Digital cellular telecommunications system (Phase 2+); Channel coding (GSM 05.03), V5.0.0, Mar. 1996.

InterDigital Comm. Corp., "16 bit ID UE Based UE Specific Masking for HS-SCCH: Updated for consistency with new Rate matching for HS-SCCH," 3GPP TSG RAN WG1#27, R1-02-0941, Oulu, Finland, Jul. 2-5, 2002.

InterDigital Comm. Corp., "16 bit UE ID Based UE Specific Masking for HS-SCCH," Discussion and Decision, 3GPP TSG RAN WG1#26, Kyung-Ju, Korea, May 13-17, 2002.

InterDigital Comm. Corp., "16 bit UE ID Based UE Specific Masking for HS-SCCH: Updated for consistency with new Rate matching for HS-SCCH," Discussion and Decision, 3GPP TSG RAN WG1#27, Olou, Finland, Jul. 2-5, 2002.

InterDigital Comm. Corp., "16 bit UE ID Based UE Specific Masking for HS-SCCH," 3GPP TSG RAN WG1#26, R1-02-0715, Kyung-Ju, Korea, May 13-17, 2002.

InterDigital Comm. Corp., "Correction to UE specific matching for HS-SCCH part 1," 3GPP TSG RAN WG1#27, R1-02-0941, Oulu, Finland, Jul. 2-5, 2002.

InterDigital Comm. Corp., "Discussion on UE Specific Masking for HS-SCCH," 3GPP TSG RAN WG1#26, R1-02-0716, Gyeongju, Korea, May 13-17, 2002.
InterDigital Comm. Corp., "UE Specific Masking for HS-SCCH part 1," 3GPP TSG RAN WG1#26, R1-02-0821, Gyeongju, Korea, May 13-17, 2002.
InterDigital Comm. Corp., "UE Specific Masking for HS-SCCH part 1," 3GPP TSG RAN WG1#26, R1-02-0830, Gyeongju, Korea, May 13-17, 2002.
InterDigital Comm. Corp., "UE Specific Masking for HS-SCCH part 1," 3GPP TSG RAN WG1#26, R1-02-0843, Gyeongju, Korea, May 13-17, 2002.
InterDigital Comm. Corp., "UE Specific Masking for HS-SCCH part 1," 3GPP TSG RAN WG1#26, R1-02-0850, Gyeongju, Korea, May 13-17, 2002.
InterDigital Comm. Corp., "UE Specific Masking for HS-SCCH part 1," 3GPP TSG RAN WG1#26, R1-02-0858, Gyeongju, Korea, May 13-17, 2002.
InterDigital Comm. Corp., "UE Specific Masking for HS-SCCH part 1," 3GPP TSG RAN WG1#26, R1-02-0859, Gyeongju, Korea, May 13-17, 2002.
InterDigital Comm. Corp., "UE Specific Masking for HS-SCCH, part 1" 3GPP TSG RAN WG1#26, R1-02-0717, Gyeongju, Korea, May 13-17, 2002.
InterDigital Comm. Corp., "HS-SCCH Signaling for 3.84 Mcps TDD," 3GPP TSG RAN WG1#23, R1-01-0224 Orlando, Florida, Feb. 18-21, 2002.
InterDigital Comm. Corp., "HS-SCCH Signaling for FDD HSDPA," 3GPP TSG RAN WG1#23, R1-01-0226 Orlando, Florida, Feb. 18-21, 2002.
InterDigital Communication Corporation, "Implicit UE Identification for HSDPA Downlink Signaling," TSG-RAN Working Group 1 #22, R1-01-0810, Torino, Italy, Aug. 27-31, 2001.
InterDigital Communication Corporation, "Simplified Illustration of the Performance Benefit of US Dependent CRC," TSG-RAN Working Group 1 #21, R1-01-0972, Torino, Italy, Aug. 27-31, 2001.
LG Electronics, "On the Criterion for UE Specific Scrambling Code", TSGR1#26-02-0771, 3GPP TSG-RAN WG1 Meeting #26, Gyeongju, Korea, May 13-17, 2002.
LG Electronics, "On User-Specific Scrambling Code for the Part 1 of HS-SCCH", Tdoc R1-02-0542, TSG-RAN WG1 Meeting #25, Apr. 9-12, 2002.
LG Electronics, "UE-Specific Scrambling Code (USSC) for HS-SCCH: USSC based on a scrambling code with time-varying property", Tdoc R1-02-0541, TSG-RAN WG1 Meeting #26, Gyeongju, Korea, May 13-16, 2002.
LG Electronics, "User-Specific Masking Codes for HS-SCCH", Tdoc R1-02-0543, 3GPP TSG-RAN WG1 Meeting #25, Paris, France, Apr. 9-12, 2002.
Lin et al., "Error Control Coding: Fundamentals and Applications", Prentice Hall Inc., (Englewood Cliffs, 1983).
Lucent Technologies, "Comparison of Detection Schemes for the HS-SCCH", 3GPP TSG-RAN WG1#25, R1-02-0699, Gyeongju, Korea, May 13-16, 2002.
Lucent Technologies, "Comparison of Schemes for UE Specific CRC," 3GPP TSG-RAN WG1#23, R1-01-0076, Espoo, Finland, Jan. 8-11, 2002.
Lucent Technologies, "False Alarm Performance of various UE ID Coding, Scrambling and CRC schemes", 3GPP TSG-RAN WG1#26, R1-02-0723, Gyeongju, Korea, May 13-16, 2002.
Lucent Technologies, "Further Results on SCCH Detection with Parity Bits", R1-02-0903, 3GPP TSG-RAN WG1#27, Oulu, Finland, Jul. 2-4, 2002.
Lucent Technologies, "Further Results on SCCH Detection with Parity Bits", R1-02-0903, 3GPP TSG-RAN WG1#27, Oulu, Finland, Jul. 2-5, 2002.
Lucent Technologies, "Performance of the HS-SCCH", 3GPP TSG-RAN WG1#25, R1-02-0649, Paris, France, Apr. 9-12, 2002.
Lucent Technologies, "Performance of the HS-SCCH," 3GPP TSG-RAN WG1#25, R1-02-0529, Paris, France, Apr. 9-12, 2002.
Lucent Technologies, "Pre-coding of UE ID before Modulo 2 addition with CRC," 3GPP TSG-RAN WG1#25, Paris, France, Apr. 2002, R1-02-0555.
Lucent Technologies, "UE procedures (HS-SCCH) to support HSDPA enhancements", R1-02-0904, 3GPP TSG-RAN WG1#27, Oulu, Finland, Jul. 2-4, 2002.
Lucent Technologies, "UE procedures (HS-SCCH) to support HSDPA enhancements", R1-02-0904, 3GPP TSG-RAN WG1#27, Oulu, Finland, Jul. 2-5, 2002.
Lucent Technologies, "Way forward on HS-SCCH coding," 3GPP TSG-RAN WG1#25, Paris, France, Apr. 2002, R1-02-0553, pp. 1-6.
Lucent Technologies, "Basis for Comparing HS-SCCH Coding Schemes", R1-02-0071, 3GPP TSG-RAN WG1#23, Korpilampi, Finland, Jan. 8-11, 2002.
Lucent Technologies, "Coding for the Shared control channel (HS-SCCH)", R1-01-1061, 3GPP TSG-RAN WG1#22, JeJu, Korea, Nov. 19-23, 2001.
Lucent Technologies,"Comparison of Schemes for UE Specific CRC ," 3GPP TSG-RAN WG1 #24, R-02-0416, Orlando, Florida, Feb. 18-22, 2002.
Minn, T. et al. "Dynamic Assignment of Orthogonal Variable-Spreading-Factor Codes in W-CDMA", IEEE Journal on selected Areas in Communications, vol. 18, No. 8, Aug. 2000.
Motorola, "Performance of the HS-SCCH with different code rates", R1-02-0718, TSG RAN WG1 Meeting #26, Gyeongju, Korea, May 13-16, 2002.
Motorola, "Performance of the HS-SCCH," TSG-RAN Working Group 1 #24, Tdoc R1-02-0610, Paris, France, Apr. 8-12, 2002.
Motorola, "Text Proposal for HS-DOC," TSG-RAN Working Group 1 #24, Tdoc R1-02-0490, Orlando, Florida, Feb. 18-22, 2002.
Motorola, "Way Forward on HS-SCCH," TSG RAN WG1 Meeting #24, R1-02-0463, Orlando, Florida, Feb. 18-22, 2002.
Motorola, "Comments on the Requirement for UE ID when HS-DSCH Indicator (HI) bit is present for High Speed Downlink Packet Access (HSDPA) Downlink Signaling", R1-01-0758, TSG-RAN Working Group 1 #21, Korpilampi, Finland, Jun. 26-28, 2001.
Motorola, "Performance of SCCH-HS with various coding options", R1-02-0039, TSG-RAN Working Group 1#23, Espoo, Finland, Jan. 8-11, 2001.
Motorola, "Sizing of the HSDPA control channels", R1-01-1210, TSG-RAN Working Group 1#23, JeJu, Korea, Nov. 19-23, 2001.
Motorola, TSG RAN WG1 Meeting #24, "Performance of the HS-SCCH", http://www.3gpp.org/ftp/TSG_RAN/WG1_RL1/TSGR1_/Docs/Zips/R1-02-0610.zip, Apr. 2002.
NEC, "Coding for HS-SCCH", R-1-02-0964, 3GPP TSG-RAN WG1 Meeting #27, Oulu, Finland, Jul. 2-5, 2002.
NEC, "Coding for HS-SCCH", R-1-02-1121, 3GPP TSG-RAN WG1 Meeting #28, Seattle, Washington, Aug. 19-22, 2002.
Nokia, "Channel coding and error detection for HS-SCCH," TSG-RAN WG1 #23, 3GPP, Jan. 2002, R1-02-0016.
Panasonic, "Removal of code mapping description over HS-SCCH", Tdoc R1(02)0774, 3GPP TSG-RAN WG1 Meeting #25, Paris France, Apr. 9-12, 2002.
Public Version of Respondents Samsung Electronics America, Inc.'s and Samsung Telecommunications America LLC's Response to the Complaint and Notice of Investigation, In the Matter of Certain 3G Wideband Code Division Multiple Access (WCDMA) Handsets and Components Thereof, Investigation No. 337-TA-601, May 31, 2007.
Qualcomm, "CCH-HS—Summary", R1-02-0157, 3GPP TSG-RAN1 #23, Jan. 8-11, 2002, Espoo, Finland.
Qualcomm, "CCH-HS structure, coding & timing", 3GPP TSG-RAN1 #23, R1-02-0156, Jan. 8-11, 2002, Espoo, Finland.
Qualcomm, "DL HSDPA control structure", R1-01-1264, TSG-RAN WG 1 #22, Jeju, Korea, Nov. 19-23, 2001.
Rebuttal Expert Report of Dr. Apostolos K. Kakaes Regarding Non-Infringement of U.S. Patent No. 6,973,579, (Feb. 21, 2008).
Responsive Supplemental Expert Report of Dr. Apostolos K. Kakaes Regarding Invalidity of U.S. Patent No. 6,973,579, (Jun. 13, 2008).
Revised minutes of RAN WG1 Rel-5 Ad Hoc meeting, TSG-RAN Working Group 1 meeting No. 21, TSGR1-01-0885, Turin, Italy, Aug. 27-31.
Revised minutes of TSG RAN WG1 #24 meeting, TSG-RAN Working Group 1 meeting No. 25, TSGR1-02-0628, Paris, France, Apr. 9-12.

Revised minutes of TSG RAN WG1 #26 meeting, TSG RAN Working Group 1, Meeting No. 27, TSGR1-02-0927, Jul. 2-5, Oulu, Finland.

Revised minutes of TSG-RAN Working Group 1 meeting No. 28, TSG RAN Working Group 1 meeting No. 28, Aug. 19-22, Seattle, WA, USA, TSGR1-02-1022.

Samsung, "An efficient signaling on SCCH-HS and channel coding of SCCH-HS", TSG-RAN Working Group 1 Meeting #23, R1-02-0051, Espoo, Finland, Jan. 8-11, 2002.

Samsung, "Position of New Data Indicator", RAN WG1 meeting #22, Jeju, Korea, Nov. 19-23, 2001, R1-01-1175.

Siemens AG, "Simplification of HS-SCCH part1 rate matching", 3GPP TSG-RAN WG 1 Meeting #27, R1-02-0934, Oulu, Finland, Jul. 2-5, 2002.

Siemens, "Coding and Rate Matching for HS-SCCH", TSG RAN WG1 Meeting #25, Tdoc R1-02-0604, Paris, France, Apr. 9-12, 2002.

Siemens, "Improved HS-SCCH Detection Performance", TSG-RAN WG1 Meeting #25, Tdoc R1-02-0608, Paris France, Apr. 9-12, 2002.

Siemens, "Improved UE Specific CRC Generation," 3GPP TSG-RAN WG1#25, Tdoc R1-02-0493, Paris, France, Feb. 1-12, 2002.

Siemens, "Rate Matching and Channel Coding for HS-SCCH", 3GPP TSG-RAN1 Meeting #25 R1-02-0605, Paris France, Apr. 9-12, 2002.

Siemens, "Revision of UE Specific Masking for HS-SCCH", 3GPP TSG-RAN WG1 Meeting #28, Tdoc 0783, Gyeongju, Korea, May 13-16, 2002.

Siemens, "Revisions of UE Specific Masking for HS-SCCH", 3GPP TSG-RAN WG1 Meeting #28, Tdoc R1-02-0934, Gyeongju, Korea, May 13-16, 2002.

Siemens, "Simplified UE-ID Masking of HS-SCCH, Part 1," Discussion and Decision, Tdoc R1-02-0914, TSG-RAN Working Group 1 #27, Oulu, Finland, Jul. 2-5, 2002.

Siemens, "UE Specific Bit Scrambling for TDD HS-SCCH", 3GPP TSG RAN WG1 Meeting #25, 3GPP TSG-RAN WG1#25, Paris, France, Feb. 9-12, 2002, R1-02-0400.

Siemens, "UE Specific Bit Scrambling for TDD HS-SCCH", 3GPP TSG-RAN WG1 Meeting #26, Tdoc R1-02-0739, Gyeongju, Korea, May 13-16, 2002.

Siemens, "UE Specific Masking for HS-SCCH", TSG-RAN WG1 Meeting #26, R1-02-0783, Gyeongju, Korea, May 13-16, 2002.

Siemens, "UE Specific Masking for HS-SCCH," TSG RAN WG1 Meeting #24, R1-02-0482, Orlando, Florida, Feb. 18-22, 2002.

Siemens, "Changes to 25.212 for HSDPA work item"; 3GPP TSG Ran WG1 Meeting #24, Orlando, USA, Feb. 18-22, 2002, R1-02-0492.

Siemens, "Discussion on channel coding schemes for the physical downlink shared control channel (HS-SCCH)", TSG-RAN Working Group 1 meeting #22, Nov. 19-23, 2001, Jeju, Korea, R1-02-1131.

Siemens, "Rate Matching and Channel Coding for HS-SCCH", 3GPP TSG-RAN1, Meeting #25, Paris, France, Apr. 9-12, 2002, R1-02-0605.

Siemens, "Structure of the downlink shared control channel for HSDPA", TSG-RAN Working Group 1 Ad Hoc meeting on HSDPA, R1-01-1030, Nov. 5-7, 2001, Sophia-Antipolis, France.

Supplemental Expert Report of Dr. Apostolos K. Kakaes Regarding Invalidity and Non-Infringement of U.S. Patent No. 6,973,579, (Jun. 2, 2008).

Texas Instruments, "HS-SCCH: Performance results and improved structure", R1-02-0637, 3GPP TSG RAN WG1 Meeting #25, Paris, France, Apr. 9-12, 2002.

Texas Instruments, "HS-SCCH: Performance Results and Improved Structure," 3GPP TSG RAN WG1 Meeting #25, R1-02-0535, Paris, France, Apr. 9-12, 2002.

TIA/EIA Interim Standard "Mobile Station-Base Station Compatibility for Dual-Mode Wideband Spread Spectrum Cellular System", TIA/EIA/IS-9-5A, (May 1995).

TR 25.858, v1.0.4, 3GPP TSG RAN #23, Jan. 8-11, 2002, Espoo, Finland, R1-02-0199.

USER EQUIPMENT IDENTIFICATION SPECIFIC SCRAMBLING

CROSS REFERENCE TO RELATED APPLICATION(S)

This application is a continuation of U.S. patent application Ser. No. 11/796,534 filed Apr. 24, 2007 [sic], which issued as U.S. Pat. No. 7,536,013 on May 19, 2009; which is a continuation of U.S. patent application Ser. No. 10/779,431, filed Feb. 13, 2004 which issued as U.S. Pat. No. 7,349,540 on Mar. 25, 2008; which is a continuation of U.S. patent application Ser. No. 10/187,640, filed Jul. 1, 2002, which issued as U.S. Pat. No. 6,973,579 on Dec. 6, 2005, which claims priority from U.S. Provisional Application No. 60/378,170, filed May 13, 2002, and U.S. Provisional Application No. 60/378,509, filed May 7, 2002, which are incorporated by reference as if fully set forth.

BACKGROUND

The present invention relates to wireless communication systems. More particularly, the present invention relates to user equipment identification specific scrambling sequences for high speed shared control channels (HS-SCCH).

A high speed downlink packet access (HSDPA) is proposed for wideband code division multiple access communication systems. HSDPA allows for high downlink data rates to support multimedia services.

To support HSDPA, high speed shared control channels (HS-SCCHs) are used. The HS-SCCHs are used to signal vital control information to the user equipments (UEs). Each HS-SCCH has two parts, referred to as Part-1 and Part-2. Part-1 carries time critical information needed by the UE. This information includes the channelization code set and the modulation type used by the high speed physical downlink shared control channel (HS-PDSCH) which carries the HSDPA payload. This information is vital to support HSDPA, since HSDPA uses adaptive modulation and coding (AMC).

To obtain its Part-1 information, each HSDPA UE monitors up to four HS-SCCHs for its information. The information for a particular UE is distinguished from other UEs by its UE identification (UE ID) specific scrambling sequence. The UE processes each monitored HS-SCCH with its UE ID specific scrambling sequence to detect the HS-SCCH intended for the UE. After processing, the UE determines on which HS-SCCH, if any, information was carried using its scrambling sequence. The UE descrambles the data carried on Part-1 of its HS-SCCH using its scrambling sequence.

Until recently, a 10 bit UE ID was used as the basis for the UE ID specific scrambling sequence. In this case, this UE ID was converted into a 40 bit scrambling sequence. To turn the 10 bit UE ID into the 40 bit UE ID specific scrambling sequence, the 10 bit UE ID is processed by a Reed-Muller block to produce a 32 bit code. The first 8 bits of the produced code are repeated and appended onto the back of the 32 bit code to produce a 40 bit code.

Although it is proposed to extend the UE ID length to 16 chips, the current proposal for the HS-SCCHs uses a 10 bit UE ID. This UE ID is converted into a 40 bit scrambling sequence. To turn the 10 bit UE ID into the 40 bit scrambling sequence, the 10 bit UE ID is processed by a Reed-Muller block to produce a 32 bit code. The first 8 bits of the produced code are repeated and appended onto the back of the 32 bit code to produce a 40 bit code.

To reduce the occurrence of false detections, it is desirable to have good separation between the produced scrambling codes for each UE ID. Accordingly, it is desirable to have alternate approaches to producing scrambling codes.

SUMMARY

A base station for use in a code division multiple access communication system comprises circuitry configured to process a user equipment identification (UE ID) by ½ rate convolutionally encoding the UE ID to produce a code. The code is used by the base station for scrambling a high speed shared control channel (HS-SCCH). The base station is configured to transmit a wireless signal. The wireless signal provides the user equipment with payload data carried on a high speed physical downlink shared channel (HS-PDSCH). The HS-PDSCH is associated with the HS-SCCH.

BRIEF DESCRIPTION OF THE DRAWING(S)

DETAILED DESCRIPTION OF THE PREFERRED EMBODIMENT(S)

Figure 1A:
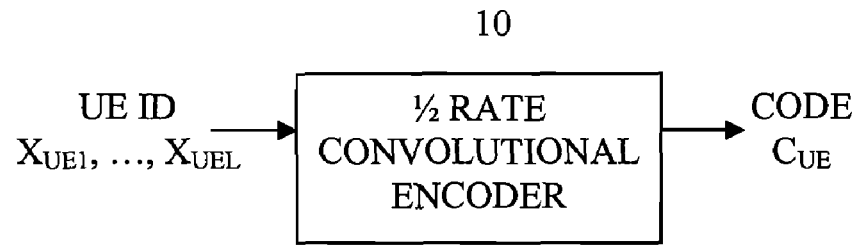
FIG. 1A is a preferred diagram of a circuit for producing a code associated with a particular user for a HS-SCCH.
Figure 1B:
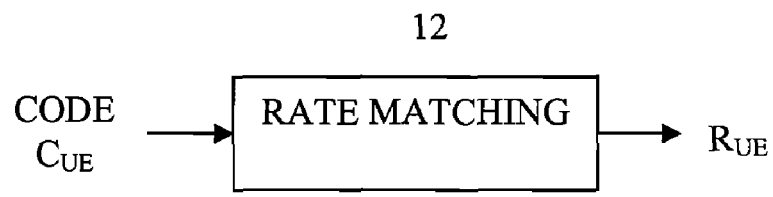
FIG. 1B is a diagram of a rate matching block used in conjunction with FIG. 1A.

Although the preferred embodiments are described in conjunction with the preferred application of the invention for use with the HSDPA of the third generation partnership project (3GPP) wideband code division multiple access (W-CDMA) communication system, the invention can be applied to other code division multiple access communication systems. FIGS. 1A and 1B are diagrams of a preferred UE ID specific scrambling sequence circuit. A UE ID, $X_{UE}$, of length L is input into the circuit. L can be any length, such as 8 bits, 10 bits, 16 bits, etc. The UE ID, $X_{UE} = \{X_{UE1}, \ldots, X_{UEL}\}$, is input into a ½ rate convolutional encoder 10 as shown in FIG. 1A. Along with the UE ID, extra bits, such as zeros, may be added to the end of the input string to extend the length of the input string and, accordingly, the output string. The use of a ½ rate convolutional encoder 10 provides for a high level of code separation between the output strings produced by different UE IDs. Additionally, current proposed 3GPP W-CDMA communication systems utilize a ½ rate convolutional encoder 10 for a forward error correction (FEC) technique. Accordingly, no additional hardware is required to generate the convolutionally encoded UE ID specific scrambling sequence. After encoding, based on the length of the output string, a rate matching stage 12 may be added to puncture bits to obtain a desired string length.

Figure 2A:
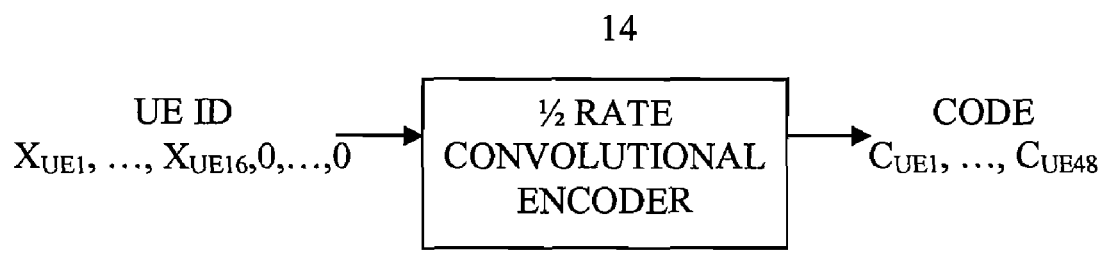
FIG. 2A is a preferred diagram of a circuit for producing a code associated with a user identification of 16 bits.
Figure 2B:
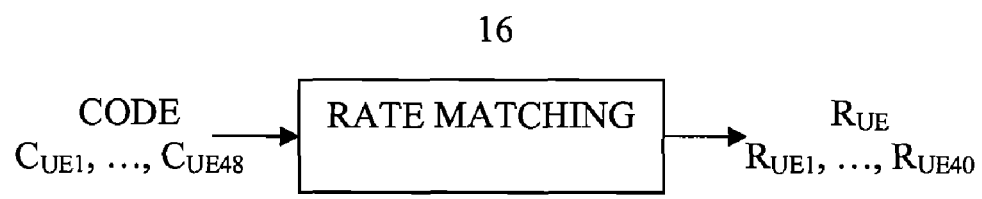
FIG. 2B is a diagram of a rate matching block used in conjunction with FIG. 2A.

FIGS. 2A and 2B are diagrams of preferred UE ID specific scrambling sequence circuit for preferred UE ID codes of length 16, L=16. The 16 bit UE ID, $X_{UE} = \{X_{UE}1, \ldots, X_{UE16}\}$, is input into a ½ rate convolutional encoder 14 along with eight zero bits appended onto the end of the input string. As a result, the input string is $X_{UE1}, \ldots, X_{UE16}, 0, 0, 0, 0, 0, 0, 0, 0$. After being processed by the ½ rate convolutional encoder 14, the output code is 48 bits in length, $C_{UE} = \{C_{UE1}, \ldots, C_{UE48}\}$.

To reduce the length of the code to a preferred length of 40 bits, eight bits are preferably punctured. FIG. 2B illustrates the rate matching stage 16 to perform the puncturing. After the rate matching stage 16, the effective length of the scrambling code is 40 bits.

Figure 4:
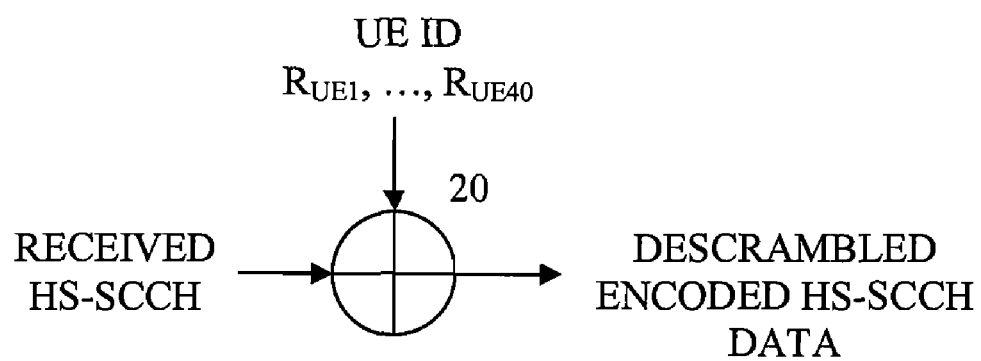
FIG. 4 is a simplified base station using the UE ID specific scrambling code.

FIG. 4 is a simplified diagram of a user equipment descrambling a HS-SCCH using the UE ID specific scrambling code. The UE ID scrambling code is mixed, such as by exclusive-or gate 18, with the received HS-SCCH for use in recovering the encoded HS-SCCH data.

Figure 3:
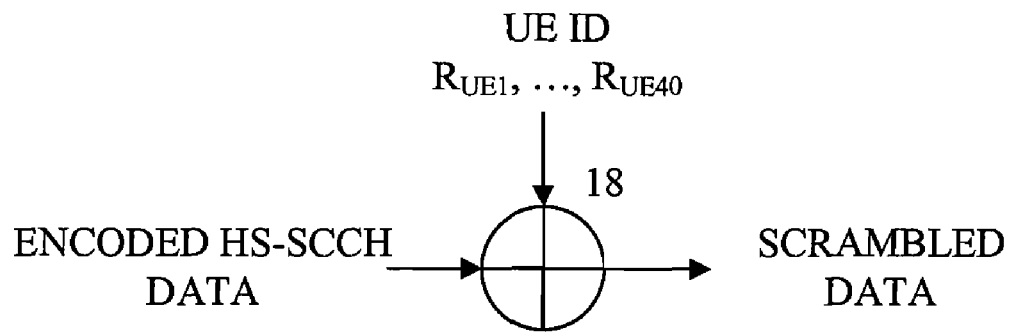
FIG. 3 is a simplified user equipment using the UE ID specific scrambling code.

FIG. 3 is a simplified diagram of a base station scrambling encoded data with the UE ID specific scrambling code for transfer over the HS-SCCH. The encoded data is mixed with the UE ID scrambling code, such as by an exclusive-or gate 20, for a particular user. The scrambled data is used to produce the HS-SCCH for transfer to the particular user.

What is claimed is:

1. A wideband code division multiple access (WCDMA) user equipment (UE) comprising:
   circuitry in the WCDMA LTE configured to process a high speed shared control channel (HS-SCCH); and
   circuitry in the WCDMA UE configured to recover payload data from a high speed physical downlink shared channel (HS-PDSCH) associated with the HS-SCCH in response to the HS-SCCH including bits; wherein the bits are a result of a combining of a user specific scrambling sequence associated with the UE with control information; and wherein the user specific scrambling sequence is a result of a ½ rate convolutional encoding of a UE identification (ID).

2. The WCDMA UE of claim 1 wherein the control information includes channelization and modulation information of the HS-PDSCH.

3. The WCDMA UE of claim 1 wherein the user specific scrambling sequence is a result of rate matching the ½ rate convolutional encoded UE ID.

4. The WCDMA UE of claim 1 wherein the control information is convolutionally encoded.

5. The WCDMA UE of claim 1 wherein the payload data of the associated HS-PDSCH is not recovered if the bits were not a result of combining the user specific scrambling sequence associated with the UE with the control information.

6. The WCDMA UE of claim 1 comprising circuitry in the WCDMA UE configured to produce the user specific scrambling sequence.

7. The WCDMA UE of claim 6 wherein the circuitry in the WCDMA UE configured to produce the user specific scrambling sequence comprises a ½ rate convolutional encoder.

8. A method for use in a wideband code division multiple access (WCDMA) user equipment (UE), the method comprising:
   processing a high speed shared control channel (HS-SCCH); and
   recovering payload data from a high speed physical downlink shared channel (HS-PDSCH) associated with the HS-SCCH in response to the HS-SCCH including bits; wherein the bits are a result of a combining of a user specific scrambling sequence associated with the UE with control information; and wherein the user specific scrambling sequence is a result of a ½ rate convolutional encoding of a UE identification (ID).

9. The method of claim 8 wherein the control information includes channelization and modulation information of the HS-PDSCH.

10. The method of claim 8 wherein the user specific scrambling sequence is a result of rate matching the ½ rate convolutional encoded UE ID.

11. The method of claim 8 wherein the control information is convolutionally encoded.

12. The method of claim 8 wherein the payload data of the associated HS-PDSCH is not recovered if the bits were not a result of combining the user specific scrambling sequence associated with the UE with the control information.

13. The method of claim 8 comprising producing the user specific scrambling sequence.

14. The method of claim 13 wherein the user specific scrambling sequence is produced using a ½ rate convolutional encoder.

* * * * *

UNITED STATES PATENT AND TRADEMARK OFFICE
CERTIFICATE OF CORRECTION

PATENT NO. : 7,970,127 B2  Page 1 of 1
APPLICATION NO. : 12/467694
DATED : June 28, 2011
INVENTOR(S) : Dick et al.

It is certified that error appears in the above-identified patent and that said Letters Patent is hereby corrected as shown below:

ON THE TITLE PAGE

At Item (56) "OTHER PUBLICATIONS", page 2, left column, line 12, after "High Speed Downlink Packet Access" delete "(HDSPA)" and insert therefor --(HSDPA)--.

At Item (56) "OTHER PUBLICATIONS", page 2, right column, line 57, after "16 bit" delete "ID UE" and insert therefor --UE ID--.

At Item (56) "OTHER PUBLICATIONS", page 2, right column, line 67, after "WG1#27," delete "Olou" and insert therefor --R1-02-0941, Oulu--.

At Item (56) "OTHER PUBLICATIONS", page 3, left column, line 63, after "Jul." delete "2-4" and insert therefor --2-5--.

At Item (56) "OTHER PUBLICATIONS", page 3, right column, line 3, after "Jul." delete "2-4" and insert therefor --2-5--.

At Item (56) "OTHER PUBLICATIONS", page 4, right column, line 13, after "Korea, R1-" delete "02" and insert therefor --01--.

IN THE SPECIFICATION

At column 1, line 11, after the word "2004" insert --,--.
At column 2, line 61, delete "$X_{UE} = \{X_{UE}1,$" and insert therefor --$X_{UE} = \{X_{UE1},$--.

IN THE CLAIMS

At Claim 1, column 3, line 21, delete "LTE" and insert therefor --UE--.

Signed and Sealed this
Twenty-third Day of August, 2011

David J. Kappos
*Director of the United States Patent and Trademark Office*